United States Patent
Ritter

(10) Patent No.: US 7,433,685 B2
(45) Date of Patent: Oct. 7, 2008

(54) ORDER METHOD

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 453 days.

(21) Appl. No.: 10/082,831

(22) Filed: Feb. 25, 2002

(65) Prior Publication Data

US 2002/0111164 A1    Aug. 15, 2002

Related U.S. Application Data

(63) Continuation of application No. PCT/CH99/00418, filed on Sep. 7, 1999.

(51) Int. Cl.
*H04Q 7/20* (2006.01)

(52) U.S. Cl. .................. 455/426; 455/406; 455/407; 455/408; 455/414.1; 455/414.3

(58) Field of Classification Search ............... 455/406, 455/407, 408, 414.1, 414.3, 426
See application file for complete search history.

(56) References Cited

U.S. PATENT DOCUMENTS

| | | | | |
|---|---|---|---|---|
| 5,410,326 | A * | 4/1995 | Goldstein | 348/734 |
| 5,754,646 | A   | 5/1998 | Williams et al. | |
| 5,870,723 | A   | 2/1999 | Pare, Jr. et al. | |
| 5,924,072 | A   | 7/1999 | Havens | |
| 5,966,697 | A * | 10/1999 | Fergerson et al. | 705/26 |
| 6,104,922 | A * | 8/2000 | Baumann | 455/410 |
| 6,336,035 | B1* | 1/2002 | Somoza et al. | 455/446 |
| 6,628,928 | B1* | 9/2003 | Crosby et al. | 455/77 |
| 6,810,386 | B1* | 10/2004 | Yurino et al. | 705/36 R |

FOREIGN PATENT DOCUMENTS

| | | |
|---|---|---|
| EP | 0 739 526 | 5/1996 |
| EP | 0 791 901 A2 | 8/1997 |
| EP | 791901 A2 * | 8/1997 |
| EP | 0 902 381 A2 | 3/1999 |
| EP | 0 950 968 A1 | 10/1999 |
| WO | WO 96/05576 | 2/1996 |
| WO | WO 98/15091 | 4/1998 |
| WO | WO 98/26381 | 6/1998 |
| WO | WO 98/28900 | 7/1998 |
| WO | WO 98/43212 | 10/1998 |
| WO | WO 98/58510 | 12/1998 |
| WO | WO 99/09502 | 2/1999 |
| WO | WO 99/27742 | 6/1999 |
| WO | WO 99/36826 | 7/1999 |
| WO | WO 99/38131 | 7/1999 |
| WO | WO 9935771 A1 * | 7/1999 |

OTHER PUBLICATIONS

Guthery, Scott B., "Java Card: Internet Computing on a Smart Card", IEEE Internet Computing Feb. 28, 1997.

* cited by examiner

*Primary Examiner*—Stephen M D'Agosta
(74) *Attorney, Agent, or Firm*—Pearne & Gordon LLP

(57) ABSTRACT

Order method comprising following steps:
  reproduction of the offer of a provider with electronic reproduction means of a personal terminal,
  selection of the offer through the user,
  execution in said personal terminal of an order program linked to the selected offer, with which order data can be entered, the order program using the order parameters transmitted with the offer,
  linking of said order data with user identification data stored in a personal identification module,
  transmission of an order message with said linked data to the provider.

6 Claims, 1 Drawing Sheet

ORDER METHOD

This application is a continuation of international application PCT/CH99/00418 filed on Sep. 7, 1999.

FIELD OF THE INVENTION

The present invention concerns a method for sending order data with a terminal to a provider, as well as a corresponding identification module and system. The present invention also concerns a method with which providers can submit their offers to users and potential customers equipped with a terminal.

RELATED ART

Patent EP689368 describes a method for packing and sending data in SMS (Short Message Services) messages through a mobile radio network. With this method, it is possible for example to transmit between various mobile radio devices not only short text messages such as for example "Please call home", but also more complex messages and programs that are automatically recognized by the receiving terminal and can trigger a certain action.

The WAP (Wireless Application Protocol) architecture describes another protocol with which the users of WAP-capable mobile devices can access Internet, Intranet and Internet-like services over various bearers such as SMS, USSD, etc.

It thus becomes possible to use mobile devices as clients in a client-server architecture in a mobile radio network. An advantage of such systems is the possibility of identifying customers, with a high degree of reliability, by means of an identification module, for example by means of a SIM (Subscriber Identification Module) card. It has for example been proposed in patent application WO92/28900 to enter order codes in a mobile device, in order for example to order products or services from a supplier. These order codes are standardized and contain at least a first field with which a supplier is clearly identified, as well as a second field with which a certain product from that supplier is indicated. Additional fields can furthermore be defined, in order for example to indicate the type of transaction and the mode of payment. The customer is reliably identified by the infrastructure in the network. The order codes entered by the users are transmitted to a clearing station in the mobile radio network and automatically assigned by it to the supplier indicated. The chosen supplier receives an order from the customer with a clear identification of this customer and of the ordered product or of the desired service.

With this method, the users can hardly define orders any more precisely. In particular, this application describes no practical procedure for determining the quantity of the ordered products, the delivery and billing address and the billing method.

Furthermore, the typing of the order codes, which may contain many characters, with an often miniaturized and incomplete keyboard is laborious and susceptible to errors.

It is an aim of the invention to propose a new and expanded order method.

It is a further aim of the present invention to propose an order method that is also suitable for ordering on the Internet and/or in a WAP system.

It is a further aim of the present invention to propose an order method that is easier and more reliable than the usual methods.

It is a further aim of the present invention to propose a method allowing the aforementioned problems to be solved and making easier the entering of long order codes and of other order data with terminals, in particular with portable terminals.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that an order program is linked to each offer.

With this order program, order data, for example the quantity of the ordered products (number, size, weight, etc.), the billing method, the delivery mode (by mail, e-mail, SMS, etc.), the delivery and billing address, etc. can be entered.

The order program is preferably stored in the terminal or in an identification module, for example in a chip card. Preferably, the order program is stored during the personalization of the identification module. The order program is preferably realized as an applet. In a variant embodiment, this applet can be downloaded into the identification module at a later stage over the radio interface.

The order program is executed when the user has selected an offer linked with this program and makes it possible to enter the order data in a comfortable manner, for example with a menu system. The order parameters transmitted with the offer are used as parameters for the order program in order to display an order menu adapted to the offered product or service.

The applet is preferably stored in an identification module of the terminal, for example in a chip card, and can be executed by data processing means in this identification module. In this manner, order processes that are security-critical can take place in a secured memory area of the terminal.

For a more reliable identification of the user, biometric parameters of the user can be obtained through a biometric sensor and compared with the parameters in a server. In this manner, the authorized user can be authenticated with each order with a high degree of reliability.

DESCRIPTION OF THE DRAWINGS

Hereafter, preferred embodiments of the invention will be described in more detail with the aid of the attached FIGURE, showing.

DETAILED DESCRIPTION OF THE INVENTION

Figure 1:
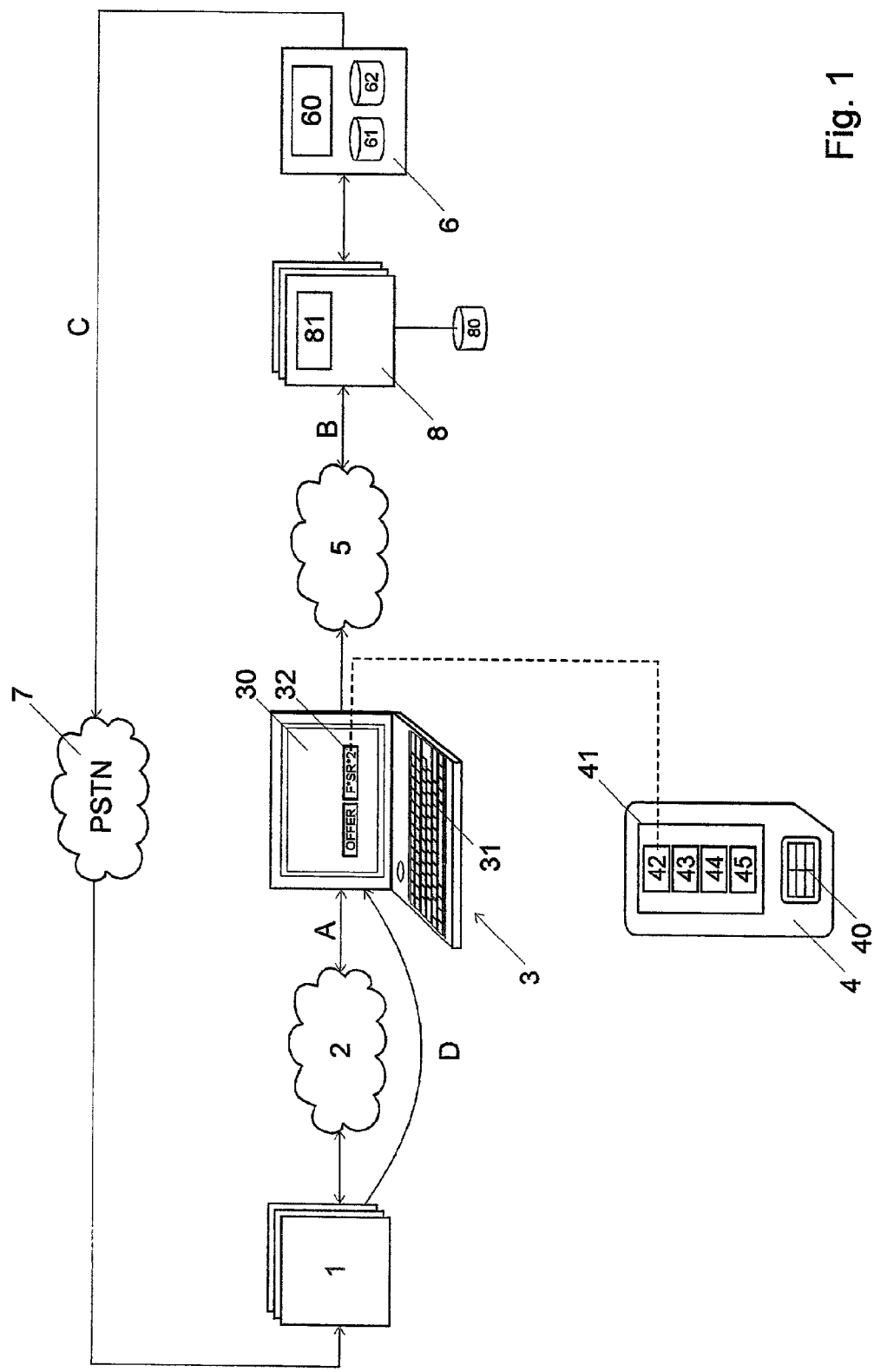
FIG. 1 a diagrammatic view of the system according to the invention with an identification module according to the invention.

The following description refers in particular to the specific case of an order with an Internet terminal. The one skilled in the art will however be able to adapt the invention to other kinds of telecommunication networks, in particular to telecommunication networks in which a chip card and/or biometric parameters of users are used to identify the users in a server in the telecommunication network. In particular, the invention is also suitable for entering orders in a mobile radio network defined according to the GSM, UMTS or GPRS standard, preferably working digitally and constructed cellularly.

FIG. 1 shows a telecommunication system with a plurality of providers 1 that can send over a suitable communication channel 2 offers to a plurality of users equipped with terminals 3.

In the example represented, the terminal 3 consists of a computer, for example a laptop or palmtop with communication means etc. The method could however also be used with a portable mobile device, for example a mobile telephone.

The provider 1 can submit an offer A, for example a product, software, data, for example musical or video data, or information, a predefined order code being linked with each offer. The order code preferably consists of a limited number of alphanumeric characters in a standardized format and preferably comprises clear provider identification (supplier identification) and clear product identification, as described in patent application WO92/28900.

The user of the terminal can reproduce the offer A of a provider 1 in his terminal. Depending on the embodiment, for example only the order code can be displayed, or an accompanying description including images and multimedia data can also be reproduced. Depending on the communication channel 2, the transmission of the offer can occur in pull-mode, i.e. on the user's initiative, or in push-mode, i.e. on the provider's initiative.

In a first embodiment of the invention, the communication channel 2 consists of the Internet, with which the user of the terminal 3 can connect over a modem, a router or the WAP protocol.

In another embodiment, the communication channel 2 consists of a mobile radio network, for example a GSM, UMTS or GPRS mobile radio network. In this case, a user can access the offer of a provider by entering the provider's URL in a WAP (Wireless Application Protocol) system. It is also possible to make available catalogs of offers from various providers, for example as "White Book" in a WAP system. Providers can also send offers by e-mail, SMS, USSD etc. to selected users.

In another embodiment, the communication channel 2 consists of a broadcast channel, for example a DAB (Digital Audio Broadcasting) or DVB (Digital Video Broadcasting) channel. In this case, the data are sent preferably as program-accompanying data and are received by terminals 3 equipped with a suitable receiver. Filtering means, among others location-dependent and user-defined filtering means, with which each user can select offers that are relevant only to him or only at his current location, can be provided in the terminal 3.

In a further embodiment, the communication channel 2 consists of a contactless interface over which connections at close range can be established. Over this interface, the user can download offers from external devices at close range (typically up to several meters). The contactless interface consists for example of an infrared interface, for example an IrdA interface, or preferably of a radio interface, for example a BlueTooth interface. The external device of the provider 1 can for example be integrated into an advertising panel in a public location or into an admission-checking device.

In yet a further embodiment, the terminal 3 can register data, in particular offers, with an optical reader, for example with a bar-code reader or with a camera and a corresponding OCR (Optical Character Recognition) system.

The terminal 3 has a receiving slot for an identification module 4, for example a chip card. In the case of a GSM-capable terminal 3, the identification module 4 consists of a SIM (Subscriber Identification Module) card. The terminal 3 has reproduction means 30, for example a LCD or VRD (Virtual Retina Display) device, with which the received offer can be reproduced. Furthermore, the terminal 3 has input means 31, for example a keyboard, a scrolling element and/or eye-controlled input means, with which a certain offer can be selected.

The terminal 3 has a receiver, with which the data transmitted over the telecommunication channel 2, in particular the offers A and the order parameters, can be received. In a first embodiment of the invention, this receiver consists of a broadcast receiver, for example a DAB or DVB receiver. In another embodiment of the invention, the receiver consists of a contactless interface, for example an infrared interface, preferably according to IrdA, or of a radio interface, for example a RFID element or a BlueTooth interface. In a further embodiment, this receiver consists of a modem or router, with which connections can be established with external hosts over the Internet or over another suitable communication protocol. In yet a further embodiment, the receiver consists of an optical reader, for example a bar-code reader or a camera. Terminals with various receivers of different types can also be devised in the framework of this invention.

In a variant embodiment of the invention, at least one such a said receiver is integrated in the housing of the terminal 3. Receivers can however also be integrated for example in a removable battery set, in the chip card 4 or in a removable module.

The terminal 3 can furthermore have location-determining means, for example a GPS receiver or a system that determines the position of the device on the basis of signals from various base stations. These location-determining means can for example be used in said filtering means in order to select location-dependent offers from providers 1. For example, in this manner only the addresses of restaurants in the vicinity of the user sent over the broadcast channel can be selected.

In said receiving slot of the terminal 3 is the identification module 4, for example a chip card in the Plug-In or ISO format. The identification element 4 is connected over a contact area 40 with the terminal 3. Data processing means 41, for example a processor with an associated memory, are contained in the chip card 4 and comprise at least the identification 44 of the user in a telecommunication network 5. In a GSM mobile radio network, the chip card consists of a SIM (Subscriber Identification Module) card and the identification 44 of the user's IMSI (International Mobile Subscriber Identity). The identification 44 is determined by the operator of the network 5 during the personalization of the chip card 4 and cannot be modified by the user.

The identification module 4 additionally has a cryptographic part 45 with which the authenticity and integrity of the received data can be verified and sent data can be signed and encrypted. The cryptographic part 45 preferably uses electronic certificates according to TTP (Trusted Third Party) services, so that signatures are certified by a trusted party.

The data processing means 41 can execute programs, among others order programs 43. In a preferred embodiment, the data processing means can execute programs ("applets") in the JAVA language (registered trademark of SUN). As will be explained further below, the received offers can be linked with one or several order programs downloaded earlier, in order to register order data. The order program is preferably written as an applet in the JAVA language. Programs in other procedural or object-oriented computer languages can however also be used in the framework of this invention.

Additionally, the identification module 4 has a memory area 42 in which order parameters received over the communication channel 2 can be stored. The order parameters are used as input parameters for the order program to adapt the menu displayed by the order program to the offered product.

In this manner, a single order program can be adapted for ordering various products and thus makes it possible to register various order data.

The order data that can be selected with the order program preferably comprise for example a unit indication (number, weight, length, etc. according to the type of product), the ordered quantity, the billing and delivery method (by mail, e-mail, SMS, etc.), the billing and delivery address, etc.

The reference number 5 shows a telecommunication network, for example a mobile radio network according to GSM, UMTS or GPRS, or the Internet. The reference number 8 shows a server managed preferably by the operator of the user's home network. The user's home network operator is the operator with whom the user has a subscription or a contract and/or the operator that has determined the user identification data in the chip card during its personalization. Order messages B of a user 3 are preferably first forwarded to the server 8 of his home network operator.

The server 8 can access a database 80 in which additional identification data are contained. The database 80 contains for example the complete address details of subscribing users of the mobile radio network 5 and is managed in this case by the operator of this network.

The server 8 contains user identification means in order to determine the identity of the sender 3 of an order message B. This identity can for example be transmitted simply with the order message, for example as IMSI (International Mobile Subscriber Identity). Cryptographic means 81 can additionally be provided in order to verify the user's identity and the order's integrity with a higher reliability, these means preferably using TTP services and the electronic signature of the order message. In a variant embodiment, a list (not represented) of biometric parameters can also be contained in the server 8, these parameters being then compared with the parameters transmitted with the order message in order to verify the user's identity.

In this manner, the server 8 can determine the identity of the user on the basis of the transmitted IMSI and complete or replace the received order message with other indications known from the user database 80. For example, the server 8 can link the user's delivery and billing address stored in the database 80 with the contents of the order message if these data have not been entered by the user.

The reference number 6 shows a server managed by the operator of the order system. The server 6 can access a provider database 61 in which provider details are stored that are necessary for forwarding the order message. In a preferred embodiment, the server 6 can additionally access a product database 62 in which providers 1 can store the available quantities and the expiry date of the offer. Optionally, it is possible to forgo this database, for example when most users access the offers of the provider 1 in real time.

The server 6 is preferably also responsible for transmitting the price for the ordered item. The determined amount is then transmitted to he server 8 that itself is responsible for the billing. Part of the determined amount is preferably credited to the home network operator for forwarding the order message.

In a first embodiment, the determined amount is debited by known methods directly from a prepaid account of the user in the identification module 4. In another embodiment, this amount is billed with the monthly telecommunication bill of the operator of the network 5. In a further embodiment, an invoice is established for this amount. In an additional embodiment, this amount is billed through a credit card institute. Preferably the user himself can decide how this amount is to be billed.

Preferably, the server 8 can also check the user's solvency. If the ordering user is not solvent, the server 8 can either refuse the order and/or supply the order with a warning for the provider 1 and the server 6.

Cryptographic means 60 can additionally be provided in order to verify the identity of the user 3 and/or of the operator of the server 8, these means using preferably TTP (Trusted Third Party) services.

The server 6 is connected over a telecommunication network 7, for example over the public telecommunication network, ISDN, a mobile radio network, a private network, Internet or also the normal post, with the providers 1. It can thus forward orders from users 3 to these providers (arrow C). This data transmission is preferably secured with TTP services. In a preferred embodiment, all confidential data between the user 3 and the provider 1 are secured so that not even the operators of the servers 6, 8 can gain knowledge of these data or modify their contents unnoticed.

In a preferred embodiment of the invention, the order message B sent by the user of the terminal 3 contains only abbreviated provider identification. Standardized abbreviations for registered providers are preferably used. The server 6 can in this case access a correspondent list in the provider database 61 in order to obtain the complete provider address. The server 6 uses this provider address in order to forward the order message to the relevant provider 1.

In a variant embodiment of the invention, several orders can also be grouped together in the server 6 and transmitted together to the provider 1, for example every hour or day. Each provider can preferably define himself how he wishes to receive the orders.

The provider who receives an order message in this manner can deliver the ordered product or the wanted information over a channel D. Depending on the product information, the delivery can occur over the same telecommunication channel 2 that was also used for transmitting the offer to the terminal 3. If the ordered item can be digitized, it can be transmitted over an electronic channel, for example as e-mail or over FTP services through the Internet or as SMS or USSD over a mobile radio network 2. In this manner, user software, musical data, for example encoded in MP3 format, video data, for example encoded in a MPEG format, etc. can for example be transmitted. The ordered item can also be an admission authorization—so to speak an entrance ticket—which can be transmitted over a contactless interface to an entry-checking device. Preferably, the user can enter himself the delivery mode of the ordered product in his order message and/or as parameter in the user database 61. Additionally, the provider 1 can preferably check whether the terminal can receive the format of the electronic data and whether it still has enough memory. For this test, JINI functions can for example be used.

With the method according to the invention, it is however also possible to order products that can be delivered only by mail or by a delivery firm.

The method for placing an order will now be described in more detail.

The user can access over the telecommunication network 2 various offers in electronic format (Pull-mode), respectively various offers can be sent to him (Push-mode). He can reproduce the received offers with the reproduction means 30, for example display them on a LCD or project them with a VRD device. A UAL (Uniform Applet Locator) 32 is linked with each offer received and displayed; the UAL corresponds to a link with an order program stored in the identification module 4 and independently marks clearly the ordered product and the provider.

If the user wishes to place an order, he can do this with his terminal 3, on which he selects with the controls 31 the desired offer. This selection triggers the order program indicated in the UAL 32 and with which order data can be entered.

In the identification module 4, several order programs can be stored as applet. In this case, each reproduced offer can contain the UAL address of the most suitable order program. New order programs can preferably be downloaded also at a later stage.

Order parameters 42 are additionally linked with each offer; they are transmitted after the selection of the offer and used as parameter for the applet 43 in order to adapt the order menu displayed by this applet to the offer. These order parameters are preferably signed by the provider 1, in order that the user can verify their integrity and authenticity. With this order program, the user can define several order data, for example among others:

Encryption Y/N: indicates whether the order of the item in question must be encrypted. This parameter is predefined as order parameter 42 but can preferably be modified by the user.

Open key of the provider (and/or of the operator of the server 6): with this key, the user can encrypt at least certain confidential parts of the order message. This field preferably cannot be modified by the user.

Type of transaction: indicates whether the transaction is an order for a product, a request for information, a money transaction, etc. This field preferably cannot be modified by the user.

Billing method: indicates how the order is to be billed, for example through debiting an account in the identification module 4, with the monthly bill of the operator of the server 6, with an invoice of this operator or of the provider 1, through a credit card institute, etc. The user can preferably choose the billing method with a list defined by the provider. Thus, certain providers can for example exclude payments by credit card number.

Delivery method: indicates the channel 2 that is to be used for the delivery of the ordered item.

Billing address: must be entered by the user when several billing addresses are linked with the user in the database 80.

Delivery address: must be entered by the user when this address differs from that which is recorded in the database 80. Preferably, the delivery address can be selected from an available public directory, for example from a WAP White Book.

URL (Uniform Resource Locator): as a link to further parameters.

Ordered quantity: in the order units defined by the provider.

Etc.

The order program 43 linked with the order can for example reproduce on the reproduction means 30 an entry mask adapted to the offer, certain data from the order parameter 42 being proposed in corresponding fields of the entry mask. Thus, each provider can link an appropriate, possibly generic applet with each offer over a UAL address, so that the users are forced to enter the order data correctly and completely. Thanks to this applet and the data already contained as parameter 42, a user can furthermore prepare an order message with a minimal number of operations, among others without having to enter his name or the name of the provider and of the ordered product.

Once all the order data have been entered, and preferably after a confirmation of the user through the communication network, the order message can be encrypted, signed and sent as SMS, USSD, e-mail, through the data channel, as WAP message etc. to the server 8 (or directly to the provider 1, depending on the offer).

In a preferred embodiment, the color of the UAL 32 changes during and after the order procedure. For example, the UAL is green before the order, yellow during the data input and becomes red when the order message has been sent. After the order procedure, the UAL becomes green again. Other means can obviously be devised within the framework of this invention to indicate the procedure status.

In the server 8, the user's identity is determined (for example on the basis of the IMSI contained in the message) and the signature verified (optionally). Additionally, biometric parameters of the user possibly contained in the order message (for example a fingerprint, iris or retina motives, chromographic image parameters, etc.) are compared with expected values in order to verify the user's identity with a maximum reliability.

If the user can be identified and the received data authenticated, the user's identity is preferably completed with indications from the user database 80. For example, the server 8 can add the billing and/or delivery address, if the user has not defined them.

The order message B is then forwarded to the server 6 that checks on the basis of the product database 62 whether the currently available quantity of the ordered item is greater than the ordered quantity. If the ordered item is no longer available in the ordered quantity, a negative confirmation is sent with the corresponding explanation to the user 3 in question. If such indications are available in the server 6, the server 6 can preferably also check the expiry date of the ordered item. Thus it is possible to check whether, at the time of ordering, the offer had not yet expired. If the offer has indeed expired, this is notified to the user 3 in question similarly as described above by means of a negative confirmation with a corresponding explanation. Apart from the expiry date, there can obviously be other grounds why an offer is no longer valid, for example in the case of last-minute offers.

In order to simplify the order procedure, this availability test is carried out in a variant embodiment only for certain, specially marked last-minute offers. In principle, no test is carried out for other orders.

If it has been determined that the ordered item is still available in the ordered quantity and the offer has not yet expired, the server 6 reads the provider abbreviation contained in the order message B and determines with this abbreviation and the provider database 61 the provider's address to which the order message is forwarded.

The data quantity indicated in the product database 62 is then decremented by the ordered quantity. Depending on the billing method indicated in the order message, the billing for the ordered item can be carried out by the server 8, as explained above.

If the ordered item is still available in the ordered quantity and the offer has not yet expired and the user 3 is solvent, an order message C can be sent to the provider 1. In the case where an end-to-end encryption is provided between the terminal 3 and the provider 1, the provider can then decrypt this message with a private key and verify the signature of the user 3 and, if necessary, of the server 6, in order to verify the origin and authenticity of the order message.

The provider can then deliver the ordered item, for example as electronic data, by mail or through a delivery firm.

Apart from the earning opportunities through the offering of services from the described method, it is also possible to commercialize a server 6, in particular the software programs for such a server, and especially programmed identification modules 4.

The invention claimed is:

1. An order method for a user ordering at least one product or service of a provider, said method comprising the steps of:
   reproducing an offer for the product or service using electronic reproduction means of a personal terminal;
   the user selecting the product or service using the personal terminal;
   the user terminal transmitting, to a remote server, product data about the selected product or service;
   the remote server transmitting, to the user terminal, an order parameter that is connected to the selected offer based on the data about the selected product or service;
   executing, in said personal terminal, an order program with which order data can be entered, wherein at least certain order parameters are used for adapting an entry mask displayed by the order program according to the selected offer, wherein said entry mask has fields that are customized to the selected product or service;
   the user using the personal terminal for entering the order data into the entry mask, including filling out said fields that are customized to the selected product or service such that said order data is customized to the selected product or service;
   determining, from identification data identification data stored in a personal identification module of the personal terminal, user identity data for identifying the user;
   linking said entered order data with the user identity data; and
   transmitting an order message with said linked data to the provider via said remote server, wherein
   said identification module is a chip card, and
   wherein said order program linked with the selected offer is executed by data processing means in said chip card, and further wherein
   said order program is an applet, and wherein
   the applet is stored in the chip card during personalization of the chip card.

2. The order method of claim 1, wherein the applet is downloaded over a radio interface.

3. An order method for a user ordering at least one product or service of a provider, said method comprising the steps of:
   reproducing an offer for the product or service using electronic reproduction means of a personal terminal;
   the user selecting the product or service using the personal terminal;
   the user terminal transmitting, to a remote server, product data about the selected product or service;
   the remote server transmitting, to the user terminal, an order parameter that is connected to the selected offer based on the data about the selected product or service;
   executing, in said personal terminal, an order program with which order data can be entered, wherein at least certain order parameters are used for adapting an entry mask displayed by the order program according to the selected offer, wherein said entry mask has fields that are customized to the selected product or service;
   the user using the personal terminal for entering the order data into the entry mask, including filling out said fields that are customized to the selected product or service such that said order data is customized to the selected product or service;
   determining, from identification data identification data stored in a personal identification module of the personal terminal, user identity data for identifying the user;
   linking said entered order data with the user identity data; and
   transmitting an order message with said linked data to the provider via said remote server, wherein
   said identification module is a chip card, and further wherein
   the order parameters are transmitted into said chip card, and wherein
   said transmitted parameters are signed electronically, so that the terminal can verify the integrity and authenticity of these parameters.

4. An order method for a user ordering at least one product or service of a provider, said method comprising the steps of:
   reproducing an offer for the product or service using electronic reproduction means of a personal terminal;
   the user selecting the product or service using the personal terminal;
   the user terminal transmitting, to a remote server, product data about the selected product or service;
   the remote server transmitting, to the user terminal, an order parameter that is connected to the selected offer based on the data about the selected product or service;
   executing, in said personal terminal, an order program with which order data can be entered, wherein at least certain order parameters are used for adapting an entry mask displayed by the order program according to the selected offer, wherein said entry mask has fields that are customized to the selected product or service;
   the user using the personal terminal for entering the order data into the entry mask, including filling out said fields that are customized to the selected product or service such that said order data is customized to the selected product or service;
   determining, from identification data identification data stored in a personal identification module of the personal terminal, user identity data for identifying the user;
   linking said entered order data with the user identity data; and
   transmitting an order message with said linked data to the provider via said remote server wherein: said order message is first transmitted to an operator that has stored said identification data in said identification module, additional user identification data are read in a database managed by said operator, at least part of the contents of said order message is linked with said additional user identification data, the linked data are forwarded on, and wherein
   said linked data are transmitted over a fixed network to said operator.

5. The order method of claim 4, wherein a plurality of said linked data of a plurality of users are transmitted simultaneously to said provider.

6. An order method for a user ordering at least one product or service of one provider among a plurality of providers, said method comprising the steps of:
   providing the plurality of providers, each one of which offers at least one product or service using a corresponding provider server, wherein unique order parameters are associated with each one of the offers;
   providing one or more order programs stored, in advance, in one or both of a personal terminal used by a user, and a removable personal identification module inserted in the personal terminal, wherein each one of the offers is linked with one or more of the one or more of the order programs;

transmitting one or more of the offers of the plurality of providers, wherein said transmitting also transmits said order parameters associated with said one or more of the offers;

in response to the user selection one of said one or more offers, executing the order program linked to the selected offer using one or both of the personal terminal and the personal identification module, wherein said executing utilizes the order parameters associated with the selected offer to adapt an entry mask customized for the product or service associated with the offer for display to the user;

in response to displaying the entry mask, the personal terminal accepting order data, from the user using the entry mask, for ordering the product or service of the selected offer;

in response to said ordering, performing an authentication of the user, said authentication including the steps of:

the personal terminal transmitting, to a remote server, identification data stored in a secured area of the removable personal identification module, the personal terminal also transmitting, to the remote server, information about the provider of the product or service ordered by the user, the remote server determining, from said identification data, user identity data for authenticating the user, and in response to authenticating the user, the remote server sending order information to the provider of the product or service ordered by the user;

in response to authenticating the user and receiving the order information, the provider completing the order; and in response to completing the order, the provider providing the product or service ordered by the user to an intended recipient wherein the provider server of the selected offer is connected to the personal terminal for providing the selected offer utilizing a first communication path for providing, and wherein the personal terminal is connected to the remote server using a second communication path for authenticating the user, and wherein the provider server is connected to the remote server via a third communication path for providing the order information.

* * * * *